United States Patent [19]

Porter

[11] 4,130,071

[45] Dec. 19, 1978

[54] FLUIDIZED-BED COMBUSTOR

[75] Inventor: James H. Porter, Vineyard Haven, Mass.

[73] Assignee: Energy Resources Company, Inc., Cambridge, Mass.

[21] Appl. No.: 803,580

[22] Filed: Jun. 6, 1977

[51] Int. Cl.² .................................................. F23D 19/02
[52] U.S. Cl. ..................................... 110/245; 34/57 A; 122/4 D
[58] Field of Search .............. 122/4 D; 110/8 F, 28 J; 34/57 R, 57 A; 432/58

[56] References Cited

U.S. PATENT DOCUMENTS

| | | | |
|---|---|---|---|
| 2,723,838 | 11/1955 | Peters | 34/57 |
| 2,835,483 | 5/1958 | Lindsay | 122/4 |
| 2,997,031 | 8/1961 | Ulmer | 122/4 |
| 3,863,359 | 2/1975 | Grega | 34/57 |
| 3,981,690 | 9/1976 | Chen et al. | 110/28 |

*Primary Examiner*—Kenneth W. Sprague
*Attorney, Agent, or Firm*—Wolf, Greenfield & Sacks

[57] ABSTRACT

A coal-dolomite mixture is ground into particle-sized bits and fed into a downward sloping duct beneath the distributor plate in a fluidized-bed combustor. High velocity air is introduced through ports spaced at intervals along the bottom of the duct, thereby entraining the mixture in an air stream. The air and entrained solid is guided upward into a slot-like chamber which passes through the distributor plate and opens into the fluidized bed a distance above the plate. Vanes in the duct and chamber and baffles above the chamber exit control the flow of the air and entrained solids so that the coal-dolomite mixture is evenly distributed throughout the fluidized bed. The distributor plate is covered with a layer of high temperature alumina stones graded in size, with the coarse stones in closest contact with the plate and the fine stones on top, thereby shielding the plate from the high temperatures of the combustion zone and preventing the weeping of hot and ash burning coal particles onto the plate. The stones are large enough so that they do not fluidize.

12 Claims, 6 Drawing Figures

FLUIDIZED-BED COMBUSTOR

BACKGROUND OF THE INVENTION

The invention in general relates to fluidized-bed combustors. Particularly it relates to methods and apparatus for feeding coal and other solids into the fluidized bed and for shielding the distributor plates of such combustors thereby providing even combustion and heating throughout the system, efficient operation, and a low rate of materials failure.

In recent years the fluidized bed has become an important medium for the production of chemcial reactions such as the oxidation of coal to produce heat. The fluidized bed is produced by grinding the solid reactant, such as coal, to particle-size bits and suspending the particles in a vertically rising stream of moving gas, such as air. It is important that the air move fast enough to cause the particles to remain suspended, but not so fast that the particles are entrained, or carried along, by the air stream. Under such conditions the air-particle mixture takes on many of the properties of a fluid; for example, the "fluid" has a lower boundary at the point of the gas inlet and an upper definite and clearly marked boundary surface at which the gas disengages itself from the system. Such a fluidized bed has become important as the method of burning coal in steam generation facilitates because it provides a well-mixed medium for efficient combustion and good heat transfer.

In the conventional fluidized bed steam generation facility the fluidizing gas, which is air in this case, is introduced at the bottom of the combustion chamber through a distributor plate. The distributor plate is generally formed of high temperature metal which defines the lower boundary of the combustion chamber, and which is perforated with many holes for the passage of the air. The conventional method of feeding coat or other solids into the fluidized bed is by gravity through a standpipe. Such standpipes project into the fluidized bed where the combustion is taking place, and thus must be cooled, usually by water circulation systems. Conventionally a number of standpipes are used, placed at intervals throughout the bed for even distribution of the solid. A coal-dolomitic stone mixture may be used to capture the sulphur contained in the coal as $CaSO_4$, a solid. Coal ash and spent dolomite are removed from the fluidized bed through water-cooled "overflow" standpipes in the bed.

The feeding of the coal-dolomite mixture (or other solid) into the fluidized bed presents significant problems in the above described steam generation facilities. If the solid is not distributed evenly throughout the bed uneven combustion rates and dolomite reaction rates can result. The overloaded sections of the bed will have a very high local heat release rate, especially when using a highly volatile coal. Such uneven heat distribution can cause materials failure in regions of excessive heating, overcooling in regions of less heat, or quenching of the dolomite reaction, all of which contribute to increased expenses and inefficiency in the system. On the otherhand, in the conventional system, if enough standpipes are used to evenly distribute the coal-dolomite feed, the bed will literally be clogged with standpipes. As a result the fluidization of the bed is decreased resulting in inefficient mixing and combustion, and in addition a significant portion of the bed volume which could be used for heat exchange (steam) tubing is usurped. As a result increased bed volume (height) may be required thereby increasing the pressure drop through the bed resulting in increased energy consumption for fluidization. Further, all the standpipes must by water-cooled, thereby reducing the amount of heat released in the combustion zone that can be used for production of steam. The uneven distribution of the dolomite throughout the system can lead to excessive discharge of sulphur into the environment.

The distributor plate in the conventional fluidized-bed steam generation facility is also a source of problems. Since the most active combustion zone is near the bottom of the bed the distributor plate may be exposed to the highest temperatures in the system. Consequently the distributor plate must be designed to allow for thermal expansion, which requires that it be "free-floating". Nevertheless because the plate may be subjected to the burden of the hot solid when the bed is slumped, the plate must be well supported. In addition, the high temperatures in the region of the plate requires that it be either cooled by large quantities of water or be well shielded. The latter method is preferred since cooling water in the region of most active combustion would be highly inefficient. The shielding material used must have openings to allow for the passage of the fluidizing air, but such openings may permit the "weeping" of hot ash and burning coal onto the distributor plate. Such hot ash and coals, being deposited on small areas by the openings in the shielding material, can cause material failure in the plate.

SUMMARY OF THE INVENTION

An important object of the invention is to provide a fluidized-bed combustor characterized by an even distribution of the coal-dolomite mixture or other solid throughout the bed and which at the same time permits a minimum of watercooled feed "standpipe" area within the fluidized bed.

It is a further object of the invention to provide a fluidized-bed combustor which achieves the above object in a system in which uneven combustion and/or reaction rates are minimized.

An additional object of the invention is to provide a fluidized-bed combustor which achieves the above objects in a system providing efficient and effective shielding of the distributor plate with minimal "weeping" of hot ash and burning coal particles onto the plate.

A further object of the invention is to achieve one or more of the above objects in a fluidized-bed combustor which is highly efficient in the consumption of fuel and the production of useable steam, and which at the same time has a relatively low rate of materials and equipment failure.

It is an additional object of the invention to provide a method and apparatus for feeding solids, including coal, into a fluidized-bed combustor, which method and apparatus achieve one or more of the other objects recited.

The invention provides for introducing a mixture of particles of one or more solids, including coal, into an open-topped duct beneath the distributor plate in a fluidized-bed combustor. As the solid particles move into the duct high velocity air is injected at one or more spaced ports along the bottom of the duct so as to entrain the particulate solid in a moving air stream. The air entrained solids are then guided upwardly into at least one slot-like chamber, pass through the distributor plate, and exit to the fluidized bed. Preferably the air and entrained solids are controlled by vanes in the duct and slot-like chambers and baffles in the fluidized bed above the chamber exits, so that the solid is evenly distributed over the bed. Preferably the distributor plate is covered with high temperature alumina stones graded in size, with the coarse stones nearest the plate and the finer stones on top. The stones are large enough so that they do not fluidize.

Numerous other features, objects and advantages of the invention will now become apparent from the following detailed description when read in conjunction with the accompanying drawing, in which:

DESCRIPTION OF THE PREFERRED EMBODIMENT

Figure 1:
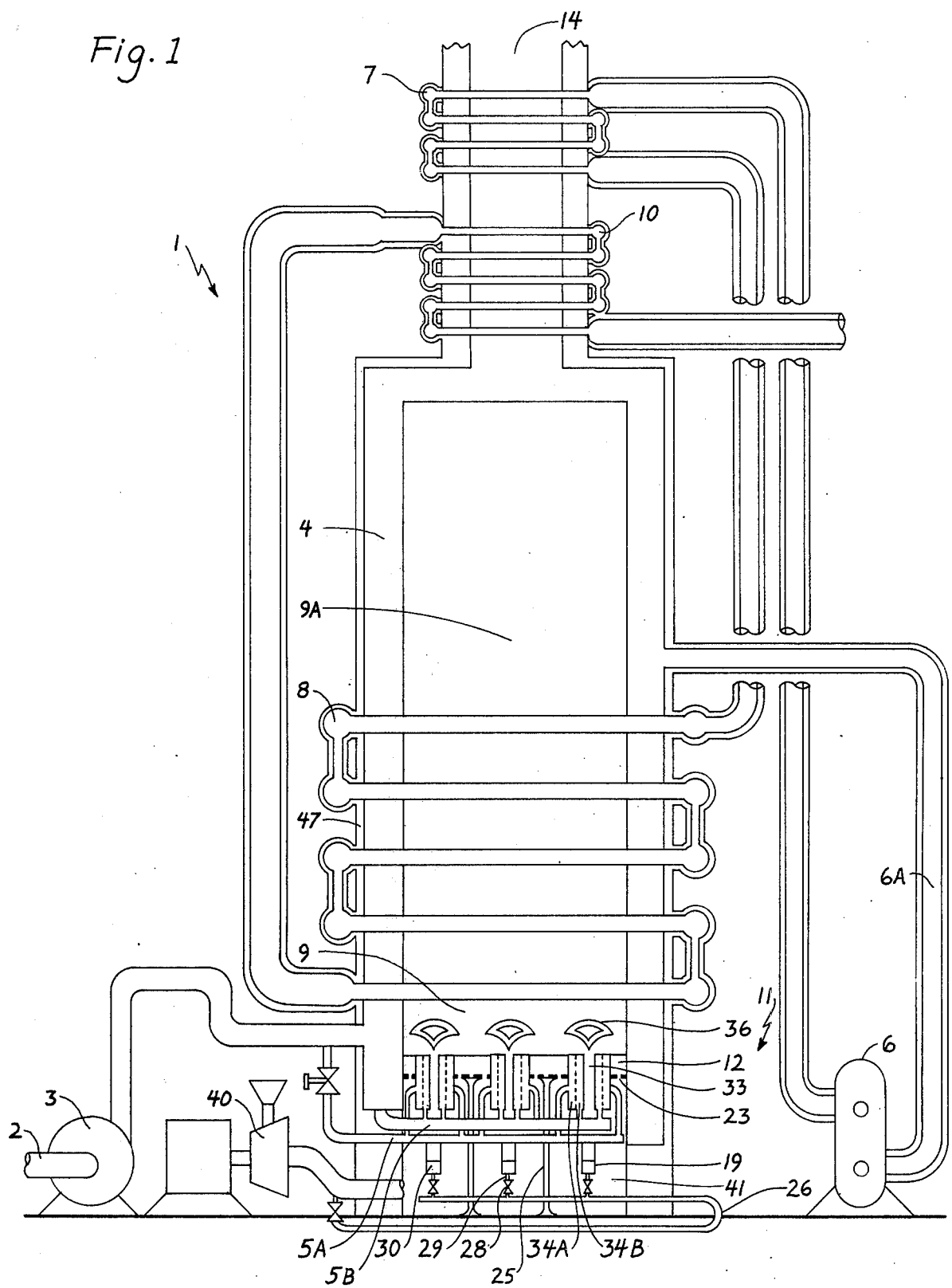
FIG. 1 is a front cross-sectional view of a fluidized-bed combustor according to the invention.

FIG. 1 is a front cross-sectional view of a fluidized-bed combustor according to the invention. The combustor comprises a plenum chamber 41, a solid fuel feed system indicated generally at 11, a distributor plate 23, a combustion chamber 9A, a waste gas stack 14 and steam generating piping shown generally at 1. As in the conventional fluidized-bed combustor, plenum chamber 41 is pressurized by compresser 40 so that a stream of air moves through distributor plate 23 to form a vertically rising column of air in combustion chamber 9A that is just sufficient to suspend the solid fuel particles fed into the chamber by feed system 11 to form a fluidized bed 9, which is an excellent medium for the combustion of the fuel. Heat produced by the burning fuel in combustion chamber 9A is used to produce steam in piping system 1. Waste solids such as ash are removed from the fluidizing bed 9A by means of standpipes (not shown) and waste gases escape through stack 14. Water from the steam generating facility condensor or other source enters the system at water intake 2. The water is driven by pump 3 into the combustor cooling system. Most of the water enters the combustion chamber wall cooling system 4 directly, while a smaller portion of the water passes first through line 5A into the cooling system for the fluidized-bed feed system 11, and then exiting through line 5B and entering into the wall cooling system 4. After leaving the wall cooling system 4 through duct 6A, the water is pumped up to steam condition pressures by pump 6, then passes into the economizer 7, and thereafter into the boiler tubes 8 located in the fluidized bed 9. Heat transfer rates are too high to allow superheating in the fluidized bed 9; gas film heat transfer inside the tubes would be limiting and the tubes would burn out. Therefore the steam is piped to just above the exit of the combustion chamber into section 10 where it is super heated. The superheated steam then passes out of the combustor system where it may be used to drive turbines etc. Since the invention resides primarily in the fluidized-bed feed system shown generally at 11 and the distributor plate shielding shown generally at 12, the detailed description will be primarily limited to these aspects of the combustor.

Figure 2:
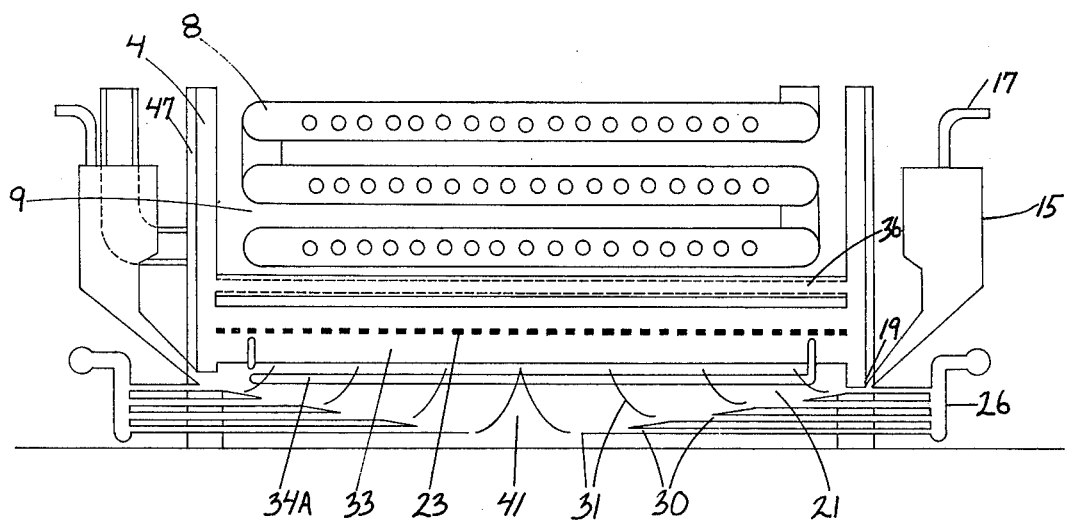
FIG. 2 is a partial side cross-sectional view of the embodiment of the invention shown in FIG. 1.

The primary elements of a fluidized-bed feed system 11 and the distributor plate shielding 12 and the relationship to one another are shown in FIGS. 1 and 2. As best shown in FIG. 2 the fluidized-bed feed system 11 is preferably composed of two sections that are mirror images of one another and meet at the mid-line of the combustor. For clarity only one side of the system is numbered. Hoppers 15 at the sides of the combustor store the coal and dolomite or other solid to be fed into the fluidized bed. Purge lines 17 maintain a flow of inert gas into the hoppers to preclude the possibility of combustion and possible explosion in the hopper. Hoppers 15 communicate with ducts 21 which preferably slope downward toward the middle line of the combustor beneath the distributor plate 23. At the bottoms of hoppers 15 are slide valves 19 which regulate the flow of coal and other solids into ducts 21. Carrier air from air mains 26 is fed into ducts 21 through ports 30 spaced at intervals along the bottoms of the ducts 21.

Vanes 31 are spaced between the air ports 30 and curve upwardly from the bottom of the ducts into slot-like chambers 33. In the preferred embodiment there are three pairs of ducts 21, each communicating with one slot-like chamber 33. Each of the three chambers 33 runs to the midpoint of the longer axis of the fluidized bed. The width of each chamber 33 is preferably small compared to the distance between the chambers. Chambers 33 pass through distributor plate 23 and extend upwardly into the fluidized bed 9. Channels 34A and 34B are formed within the portion of the walls of chambers 33 which extend above and just below the distributor plate 23. Water pipes 5A and 5B connect with channels 34A and 34B respectively to carry water to and from the channels for cooling purposes. Baffles 36 are located in the fluidized bed above the exits of chambers 33, and the hollow interior of each baffle 36 carries cooling water.

As in conventional fluidized-bed combustors distributor plate 23 determines the lower boundary of the fluidized bed. Conventional air compressor and filter system 40 feeds pressurized air into a plenum chamber 41 beneath the distributor plate 23. Holes within the distributor plate 23 distribute the pressurized air from plenum chamber 41 into the fluidized bed 9. The pressure within plenum chamber 41 and the holes within the distributor plate are selected so that the flow of air through the main chamber 9A of the combustor is sufficient to maintain in suspension the particles of solid in the fluidized bed 9.

Figure 3:
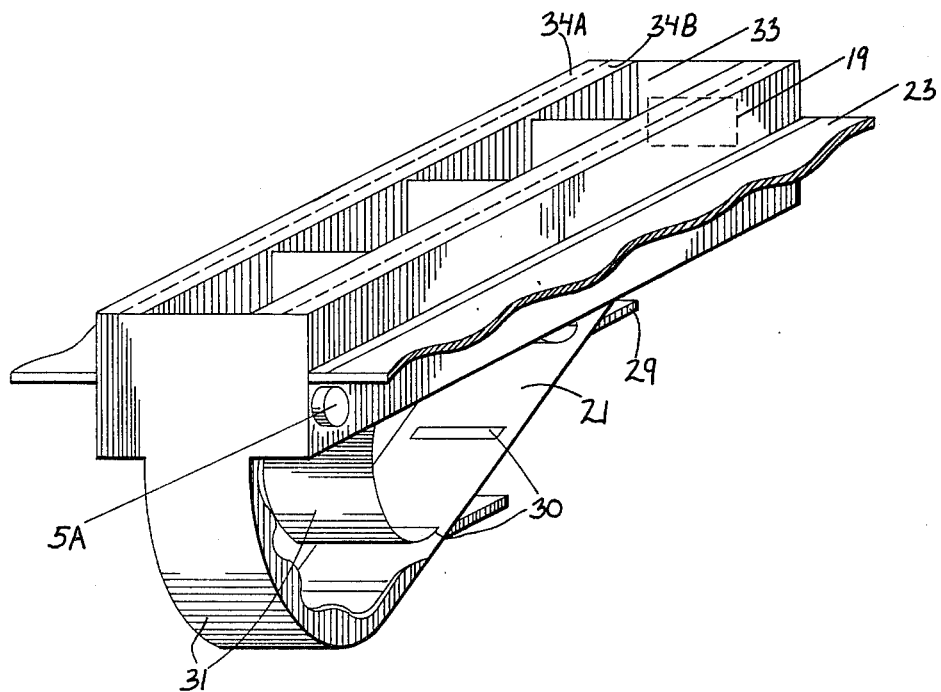
FIG. 3 is a detail of the solid-particle feed system according to the invention, shown in perspective.
Figure 4:
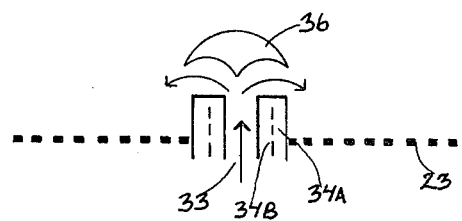
FIG. 4 is a detail view of the exits for the air and entrained solid from the slot-like chamber into the fluidized bed.
Figure 5:
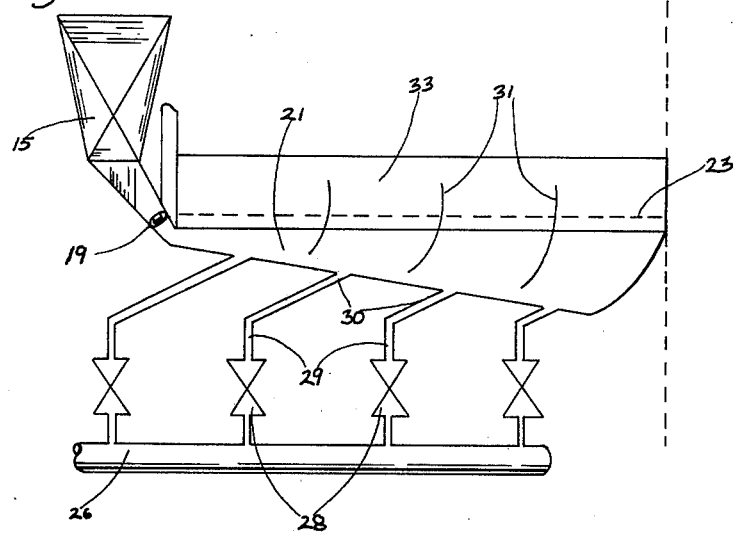
FIG. 5 is a side view showing the feed system of FIG. 3 and also including the solid particle and air source elements.

FIGS. 3, 4 and 5 show details of the system for feeding the solids into the fluidized bed. Air ports 30 are preferably rectangular in form and extend substantially across the width of ducts 21. Carrier air feed pipes 29 are also preferably rectangular where their ends meet ports 30. Air flow control valves 28 allow the flow of air to each of the ports 30 to be individually adjusted. Vanes 31 extend generally vertically from near the bottoms of the ducts 21 curving upwardly into chambers 33, and also extend horizontally across the width of the ducts 21 and chambers 33.

Figure 6:
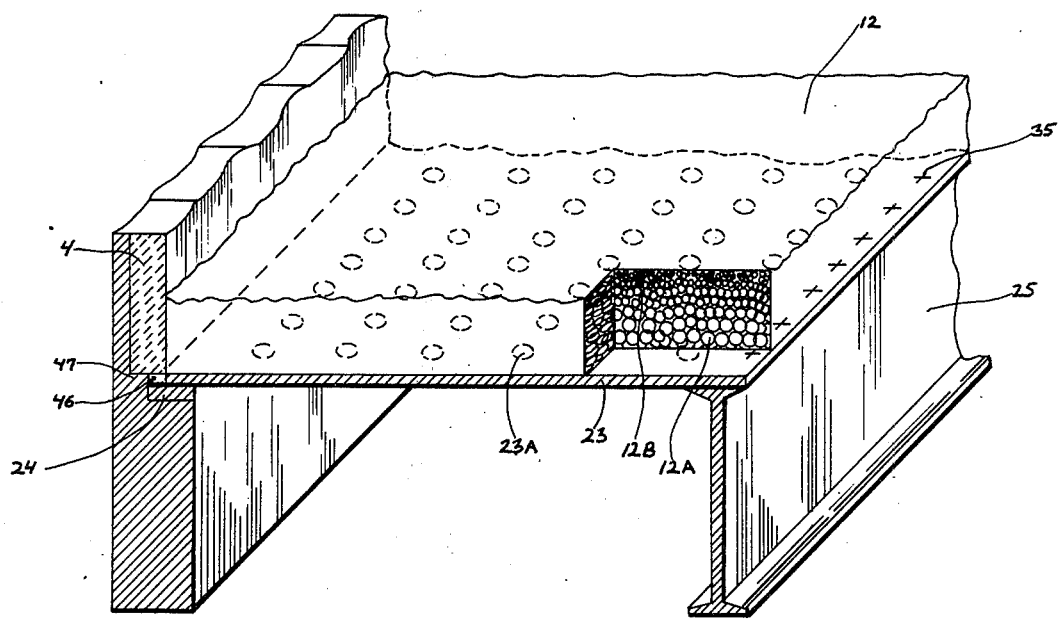
FIG. 6 is a perspective view of a detail of the invention showing the distributor plate and distributor plate shielding.

FIG. 6 shows in detail the distributor plate suspension and heat protection shield. The distributor plate 23 is supported by metal support ring 24 around the periphery of the plate, and by I-beams 25 underneath it. The distributor plate 23 fits within a slot 46 in combustor base wall 47 and is not welded, bolted, or otherwise fastened to either the support ring 24 or the I-beams 25 so that it may expand and contract freely upon change of temperature. Feed chambers 33 are bolted to I-beams 25 by means of counter-sunk bolt holes 35 in the I-beam. Distributor plate 23 is covered with high temperature alumina stone 12. The stone is graded in size, with the coarsest stones 12A at the bottom in contact with the plate and the finer stones 12B on top. The stones are all large enough so that they do not fluidize at design conditions.

Not shown in the drawing is the conventional means for removing the burnt ash and spent dolomite which include water-cooled standpipes projecting into the fluidized bed.

All parts of the solid feed system, cooling pipes, and air lines are preferably made of steel although other metals or heat resistant materials may be used. Preferably the parts such as the baffles 36 and the walls of chambers 33 are made of high temperature steel, and the distributor plate is made of a high temperature metal such as an Incoloy 800 series metal of Huntington Alloys, Huntington, West Virginia. Preferably the solid fed into the fluidized bed is a mixture of coal and a dolomite such as limestone, although the invention may be used to feed almost any solid into a fluidized bed, so long as the solid is ground to a size in which it may be pneumatically transported. Preferably the solid is ground and classified into a size range typically between 0.25 inch and 0.0285 inch (12 mesh). Additionally, the solids should be dry to avoid conglomeration.

The system is operated by feeding the premixed and preground coal and dolomite by gravity through slide valves 19 into the ducts 21. Slide valves 19 are adjusted so that the amount of coal-dolomite mixture entering ducts 21 is sufficient to maintain the fluidized bed at the desired concentration of solid. As the coal-dolomite mixture falls downwardly through ducts 21 high velocity air is introduced into the ducts through ports 30. The high velocity air entrains the coal-dolomite particles, and the air and entrained particles move upward through ducts 21 and into chambers 33. Guide vanes 31 direct the flow of air and entrained particles upward through chambers 33 into the fluidized bed 9. Baffles 36 suspended in the bed just above the exit of chambers 33 guide the flowing air and entrained particles away from the chambers so that the coal-dolomite mixture is spread evenly throughout the bed.

A feature of the invention is that the particled solids may be distributed very evenly throughout the bed 9. The flow rate and the distribution of the solid particles into the fluidized bed will depend on the amount of solid introduced into ducts 21 by slide valves 19, the particle size density, the shape and geometry of the ducts 21, guide vanes 31, chambers 33, and baffles 36, the clearances of guide vanes 31 above the base of ducts 21, the velocity of the entraining air entering through the ports 30, and the angle of impingement of the entraining air against the guide vanes 31. All of the above factors can be varied in the design and adjustment of the system in order to maintain the optimum flow rate of distribution of the solid particles into the fluidized bed. It has been found that approximately 10% to 20% of the required minimum fluidizing air is necessary to evenly feed the solids into the bed at a rate of between 150 to 300 pounds per hour of coal per square foot of bed cross section.

As described above, all metal parts projecting into the combustion chamber, except the distributor plate, are internally cooled by the flow of water through channels in the parts. Although much of the heat removed from the area of the combustion chamber in the vicinity of the water cooled parts is ultimately delivered to the power generation facility associated with the combustor, the removal of heat within the area of combustion does tend to reduce the combustion efficiency. Thus it is important that the cooled surfaces projecting into the fluidized bed be kept to a minimum. A feature of the invention is that it permits the fuel to be distributed extremely evenly throughout the bed and at the same time permitting the water cooled surfaces projecting into the bed to be minimized, since the width of chambers 33 is preferably small as compared to the distance between the chambers.

Another feature of the invention is the method of shielding the distributor plate with alumina stone. The gradual change in size of stones from coarse stones 12A nearer to the plate to finer stones 12B at the top surface of the shield smoothly channels the air flow from the holes 23A in plate 23 out into the fluidized bed. The fine stones 12B on top prevent the "weeping" of hot ash and burning coal particles back through the air channels onto the plate, where they could seriously damage the plate or plenum. The larger stones 12A at the bottom prevent the smaller stones 12B from falling through holes 23A. Thus the distributor plate 23 is effectively protected from damage by intense heat above it and at the same time the air flow through the plate and shielding material is maintained.

There has been described a novel method and apparatus which provide a fluidized-bed combustor characterized by even distribution of the solid fuel particles throughout the fluidized bed, efficient operation, low rates of material failure in the high temperature region, and numerous other advantages. It is evident that those skilled in the art may make numerous uses and modifications of and departures from the specific embodiment described herein without departing from the inventive concepts. For example, although the invention has been described and illustrated incorporated into a square or rectangular fluidized bed, it may also be adapted to a circular bed or a bed of almost any other shape. The embodiment shown utilizes three sets of chambers 33, duct pairs 21, and other supporting elements. However the invention may be utilized with any number of such chambers (including one) depending upon the size of the fluidized bed desired. Similarly, the number of air ports 30 and vanes 31 in each duct may vary so long as the air flow through the system is not obstructed. Moreover, the shape of the ducts 20, vanes 31, chambers 33 etc. may vary widely from the rectangular shape shown in the preferred embodiment, so long as the shape selected permits the effective entrainment of the solid particles by the air streaming from ports 30. And the alumina stone or shield may be replaced by any satisfactory heat resistant stone or other suitably size-graded material. Many other variations of the invention are possible. Consequently the invention is to be construed as embracing each and every novel feature and novel combination of features present in or possessed by the fluidized-bed combustion method and apparatus herein described.

What is claimed is:

1. A method of feeding one or more particled solids into a fluidized-bed combustor comprising, introducing the solid particles into one or more open-top ducts beneath the distributor plate of the fluidized bed, injecting high velocity gas into the ducts at one or more ports spaced along the bottom of the ducts so as to entrain the particled solid in a gas stream, and guiding the gas and entrained solids upwardly through and out of at least one chamber passing through the distributor plate and having an exit into the fluidized bed at a point above the distributor plate, so that the solid is evenly distributed throughout the bed.

2. A method of feeding solids into a fluidized bed in accordance with claim 1 wherein the solid particles are introduced into the ducts beneath the distributor plate by means of gravity.

3. A method of feeding solids into a fluidized bed in accordance with claim 2 wherein said step of guiding includes:

directing the flow of gas and entrained solids within the ducts and chambers by means of vanes, and controlling the distribution of gas and entrained solids into the fluidized bed by means of baffles disposed above the exits of said chambers.

4. A method of feeding solids into a fluidized bed in accordance with claim 3 wherein:

said gas comprises air, and said solids include coal and dolomite stone.

5. A method of feeding solids into a fluidized bed in accordance with claim 4 and further including the step of covering the distributor plate with high temperature resistant stone graded in size with the coarser stone closest to the plate and the finer stones on top away from the plate, said stones being large enough so they do not fluidize.

6. A method in accordance with claim 5 wherein said step of covering utilizes high temperature alumina stone.

7. Apparatus for feeding one or more particled solids into a fluidized bed having a distributor plate, comprising:

at least one open-topped duct located beneath the distributor plate and having an opening at one end for receiving the particled solid, means for moving the particled solids into and through said duct, at least one port in the bottom of each duct for injecting gas into said duct, whereby the solids may be entrained into the gas stream, at least one chamber means communicating with the open top of said ducts, said chamber means passing through said distributor plate and having an exit into said bed above the distributor plate, and guide means adjacent the ports whereby said gas and entrained solids may be directed through said ducts and said chamber means and distributed throughout the fluidized bed.

8. An apparatus for feeding solids into a fluidized bed in accordance with claim 7 wherein:

said duct is downward sloping beneath said distributor plate, and said means for moving comprises a gravity feed.

9. Apparatus for feeding solids into a fluidized bed in accordance with claim 8 wherein said guide means comprises:

means within said ducts and said chamber means for directing the flow of said air and entrained solids, and baffle means suspended in said fluidized bed directly above the exit of said chamber means for controlling the distribution of the particled solids throughout said bed.

10. Apparatus for feeding solids into a fluidized bed in accordance with claim 9 wherein there are at least two of said ducts and said chamber means and wherein the width of said chamber means is less than the distance between said chamber means.

11. Apparatus for feeding solids into a fluidized bed in accordance with claim 9 wherein:

said particled solids comprise a mixture of coal and dolomite stone, and said gas comprises air.

12. A fluidized-bed combustor for burning a particled solid comprising:

a distributor plate, at least one open-topped duct located beneath the distributor plate and having an opening at one end for receiving the particaled solid, means for moving the particled solids into and through said duct, at least one port in the bottom of each duct for injecting gas into said duct, whereby the solids may be entrained into the gas stream, at least one chamber means communicating with the open top of said ducts, said chamber means passing through said distributor plate and having an exit into said bed above the distributor plate, guide means adjacent the ports whereby said gas and entrained solids may be directed through said ducts and said chamber means and distributed throughout the fluidized bed, and shielding means for said distributor plate comprising temperature resistant stone graded in size, with the coarsest stone closest to the plate and the finest stone on top, said stones being large enough so that they do not fluidize.

* * * * *